UNITED STATES PATENT OFFICE.

JAMES H. STEBBINS, JR., OF NEW YORK, N. Y.

COLORING-MATTER OR DYE-STUFF.

SPECIFICATION forming part of Letters Patent No. 253,445, dated February 7, 1882.

Application filed December 23, 1881. (Specimens.)

*To all whom it may concern:*

Be it known that I, JAMES H. STEBBINS, Jr., a citizen of the United States, residing at New York, in the county and State of New York, have invented new and useful Improvements in Dye-Stuffs or Coloring-Matters, of which the following is a specification.

This invention relates to a blue dye-stuff or coloring-matter which is produced by the action of para-amido-dimethylaniline hydrochloride upon an alkaline solution of phenol in the presence of chloride of lime.

In carrying out my invention I take 9.3 pounds of nitroso-dimethylaniline hydrochloride, which I dissolve in five hundred pounds of water. This mixture I then heat to 45° to 50° centigrade, with ten pounds of zinc-dust, which reduces the nitroso compound, forming para-amido-dimethylaniline hydrochloride, and then filter in order to separate out the zinc-dust. The filtrate thus obtained is treated with a solution composed of phenol, (carbolic acid,) 9.4 pounds; caustic-soda solution, twelve pounds, (1.29 specific gravity;) and water, two hundred pounds. When cold I add, under constant stirring, a solution composed of chloride of lime, 6.3 pounds; water, one hundred pounds. The mixture so obtained immediately turns blue, and in a short time becomes filled with a copious dark-blue crystalline precipitate. This may then be collected on a filter and slightly washed with cold water, when it is ready for use in the shape of a paste.

This dye-stuff dissolves readily in alcohol and in hot water with a fine blue color, and dyes wool mordanted with the usual alum or chrome mordants, at a temperature of about 180° Fahrenheit, of a deep indigo-blue color. Dilute hydrochloric acid, and also oxalic acid, added to its aqueous solution, destroys the coloring-matter. Strong sulphuric acid dissolves a strongly-concentrated paste of the coloring-matter with a china-blue color, while evolving a gas strongly smelling of chlorine. This solution is turned almost colorless by the addition of hot water. Potash added to its aqueous solution produces no perceptible change.

I do not wish to limit myself to the proportions of the ingredients herein described, as they may be changed without departing from my invention.

What I claim as new, and desire to secure by Letters Patent, is—

As a new article of manufacture, the blue dye-stuff or coloring-matter herein described, and having the characteristics above set forth.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.